United States Patent
Kim

(12) 
(10) Patent No.: US 6,177,970 B1
(45) Date of Patent: Jan. 23, 2001

(54) IN-PLANE SWITCHING MODE LIQUID CRYSTAL DISPLAY AND A METHOD MANUFACTURING THE SAME

(75) Inventor: Dong-Gyu Kim, Kyungki-do (KR)

(73) Assignee: Samsung Electronics Co., Ltd., Seoul (KR)

( * ) Notice: Under 35 U.S.C. 154(b), the term of this patent shall be extended for 0 days.

(21) Appl. No.: 09/160,377

(22) Filed: Sep. 25, 1998

(30) Foreign Application Priority Data

Sep. 25, 1997 (KR) ................................................ 97-48785

(51) Int. Cl.[7] ............................ G02F 1/136; G02F 1/1343
(52) U.S. Cl. ............................ 349/43; 349/139; 349/141; 349/143
(58) Field of Search .................................... 349/141, 143, 349/139, 43, 42

(56) References Cited

U.S. PATENT DOCUMENTS

| | | | |
|---|---|---|---|
| 5,786,876 | * 7/1998 | Ota et al. | 349/42 |
| 5,847,781 | * 12/1998 | Ono et al. | 349/44 |
| 5,852,485 | * 12/1998 | Shimada et al. | 349/141 |
| 5,892,562 | * 4/1999 | Yamazaki et al. | 349/141 |
| 5,995,182 | * 11/1999 | Watanabe et al. | 349/110 |
| 5,995,187 | * 11/1999 | Wakagi et al. | 349/141 |
| 6,014,190 | * 1/2000 | Kim et al. | 349/39 |

\* cited by examiner

Primary Examiner—William L. Sikes
Assistant Examiner—Julie Ngo
(74) Attorney, Agent, or Firm—Howrey Simon Arnold & White, LLP

(57) ABSTRACT

A gate wire including a gate line and a gate electrode and a common signal line are formed on a substrate, and a gate insulating layer is formed over the gate wire and the common signal line. A semiconductor layer and an ohmic contact layer are sequentially formed on the gate insulating layer of the gate electrode, a source and a drain electrode thereon and a data line connected to the source electrode on the gate insulating layer are formed. A protection insulating layer is formed on the data line and the source and the drain electrodes. Common electrodes that are connected to the common signal line and pixel electrodes, which are connected to the drain electrode, are formed thereon. An alignment layer, which is in direct contact with the common electrodes and the pixel electrodes, is formed in pixel region where the common electrodes and the pixel electrodes are formed. The thickness of the pixel electrodes and the common electrodes is equal to or less than 1,000 Å with a taper angle.

14 Claims, 5 Drawing Sheets ed States Patent...

IN-PLANE SWITCHING MODE LIQUID CRYSTAL DISPLAY AND A METHOD MANUFACTURING THE SAME

BACKGROUND OF THE INVENTION

1. Field of the Invention

The present invention relates to liquid crystal displays and a method of manufacturing the same. More particularly, the present invention relates to liquid crystal displays that have electrode arrays for applying electric fields parallel to substrates and thin film transistors as switching elements and a method of manufacturing the same.

2. Description of the Related Art

A liquid crystal display (LCD) having an electrode array for generating an electric field parallel to substrates (IPS mode; in-plane switching mode) is disclosed in U.S. Pat. No. 5,598,285 to Kondo et al.

The IPS mode LCD of Kondo et al. has two substrates opposite each other and a liquid crystal layer therebetween. Two kinds of electrodes for generating an electric field, common electrodes and pixel electrodes, are formed on one of the substrates. An alignment layer is coated on the electrodes.

However, since dielectric layers as a gate insulating layer or passivation layer, which are made of oxide or nitride, are formed on the common electrodes and the pixel electrodes, a potential difference is generated between the electrodes and the alignment layer. As a result, the effective voltage applied to the liquid crystal layer is decreased, and an afterimage appears due to a decrease in the effective voltage. Accordingly, a high driving voltage is required to drive the liquid crystal.

Also, since the two kinds of electrodes are made of different layers and have different thicknesses, the surface of the alignment layer may not be flat, causing non-uniform rubbing which may result in the light leakage.

SUMMARY OF THE INVENTION

In view of the above, it is an object of the present invention to reduce the light leakage and the afterimage, and to lower the driving voltage of an IPS mode liquid crystal display.

These and other objects, features and advantages are provided, according to the present invention, by removing dielectric layers between pixel electrodes and an alignment layer.

Common electrodes and pixel electrodes may be formed on a passivation layer, a gate insulating layer or a transparent insulating substrate, and they directly contact an alignment layer by removing the passivation layer or the gate insulating layer on the electrodes.

Potential difference is not generated between the electrodes and the alignment layer, and the effective voltage applied to the liquid crystal layer is not decreased.

The thickness of the pixel electrode and the common electrode on the passivation layer may be equal to or less than 1,000 Å. It is preferable that the electrodes are tapered.

The alignment layer has a flat surface since the electrodes are relatively thin and tapered. The flat surface enables uniform rubbing, and reduces the leakage of light.

According to the present invention, a gate wire including a gate line delivering a scanning signal and a gate electrode connected to the gate line, and a common signal line are formed on the substrate. A gate insulating layer over the gate wire and the common signal line is formed, and a semiconductor layer on a portion of the gate insulating layer over the gate electrode is formed. A data line crossing the gate line is formed on the gate insulating layer, a source electrode which is connected to the data line is formed on the semiconductor layer, and a drain electrode which is separated from the source electrode is formed on the semiconductive layer. A protection insulating layer covering the source and the drain electrodes and the data line, common electrodes which are connected to the common signal line, and pixel electrodes which are formed respectively between the common electrodes and are connected to the drain electrode are formed on the substrate. An alignment layer aligning liquid crystal material is formed on the common electrodes and the pixel electrodes, to be contacted with the common and the pixel electrodes.

Here, the common electrodes and the pixel electrodes may be formed on the protection insulating layer, the gate insulating layer or the substrate. The protection insulating layer or the gate insulating layer on the common electrodes and the pixel electrodes are removed, to directly contact the alignment layer with common electrodes and the pixel electrodes.

DETAILED DESCRIPTION OF THE PREFERRED EMBODIMENTS

Figure 1:
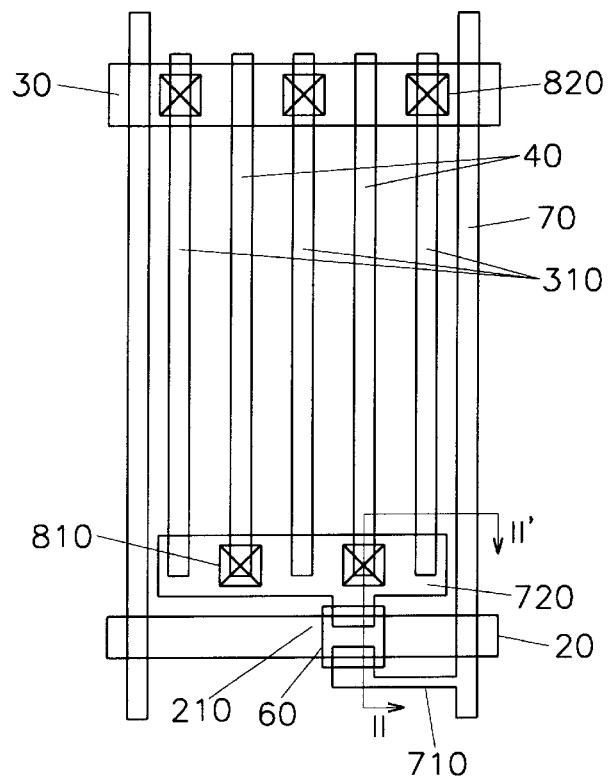
FIG. 1 is a layout view of a panel for a liquid crystal display according to a first embodiment of the present invention.

The present invention will now be described more fully hereinafter with reference to the accompanying drawings, in which preferred embodiments of the present invention are shown. This invention may, however, be embodied in different forms and should not be construed as limited to the embodiments. In the drawings, the thickness of layers and regions are exaggerated for clarity.

Figure 2:
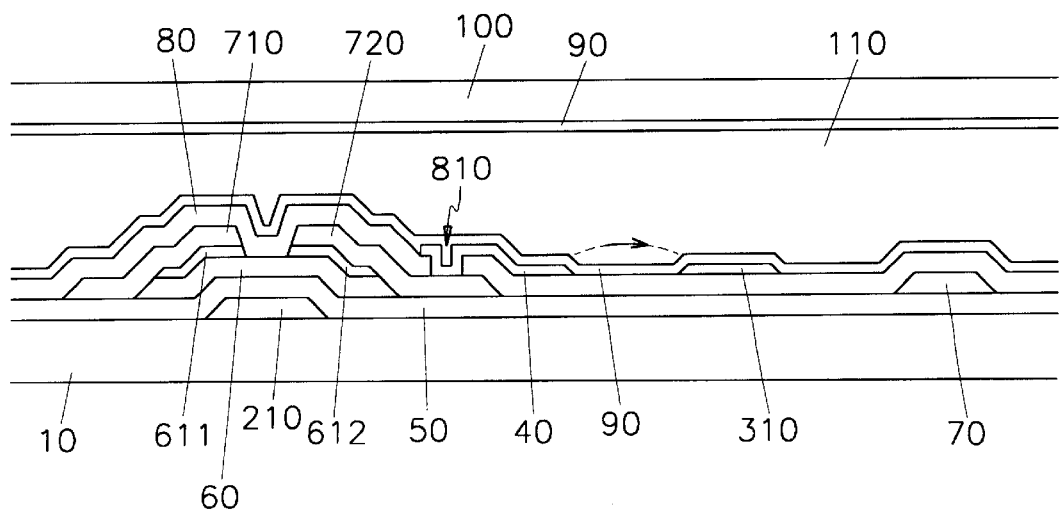
FIG. 2 shows a cross-sectional view of the panel illustrated in FIG. 1 taken along line II—II of the same drawing.

First, the structure of a panel for a liquid crystal display according to the first embodiment of the present invention will be described. FIG. 1 is a layout view of a panel, and FIG. 2 is a cross-sectional view of the panel illustrated in FIG. 1 taken along line II—II' of the same drawing.

A gate wire including a transverse gate line 20 delivering a scanning signal from outside and a gate electrode 210 which is a part of the gate line 20, and a common signal line 30 parallel to the gate line 20 are formed on the transparent substrate 10. A gate insulating layer 50 is formed over the gate wire 20 and 210 and the common signal line 30.

A semiconductor layer 60 and an ohmic contact layer 611 and 612 are sequentially formed on a portion of the gate insulating layer 50 over the gate electrode 210. The ohmic contact layer has two portions 611 and 612 separated from each other with respect to the gate electrode 210. A longitudinal data line 70 crossing the gate line 20 and the common signal line 30, and delivering a data signal from the outside is formed on the gate insulating layer 50. A source electrode 710, branched from the data line 70 extending to the gate electrode 210, and a drain electrode 720 are formed on two portions 611 and 612 of the ohmic contact layer, respectively. The drain electrode 720 is extended and is widely formed to the transverse direction. A protection insulating layer 80 is formed over the data line 70, and the source and the drain electrodes 710 and 720. On the protection insulating layer 80 of a pixel region defined by crossing the gate line 20 and the data line 70, common electrodes 310 that are parallel with the data line 70 are formed in the longitudinal direction, and pixel electrodes 40 that are parallel with the common electrodes 310 are respectively formed between the common electrodes 310. The common electrodes 310 are connected to the common signal line 30 through the contact hole 820 of the protection insulating layer 80 and the gate insulating layer 50, and the pixel electrodes 40 are connected to the drain electrode 720 through the contact hole 810 of the protection insulating layer 80. The thicknesses of the pixel electrodes 40 and the common electrodes 310 are 1,000 Å or less. Storage capacitors are formed then the portion where the pixel electrodes 40 and the common signal line 30 overlap each other via the protection insulating layer 80 and the gate insulating layer 50, and under the portion where the common electrodes 310 and the drain electrode 720 overlap each other via the protection insulating layer 80.

Two alignment layers 90 are formed over the entire surfaces of the substrate 10 and an opposing substrate 100, and a liquid crystal material 110 is injected between the two substrates 10 and 100. The liquid crystal molecules of the liquid crystal material 110 are driven by an electric field formed by a potential difference between the pixel electrodes 40 and the common electrodes 310, and parallel to two substrates 10 and 100. The dotted line of FIG. 2 is the direction of how the electric field is applied.

As shown in FIG. 2, since the alignment layer 90 of the substrate 10 contacts the common electrodes 310 and the pixel electrodes 40, the potential difference between the pixel electrodes 40 and the common electrodes 310 and the effective voltage applied to the liquid crystal molecules only through the alignment layer 90 are substantially similar to each other. Accordingly, the drive voltage is minimized and the generation of an afterimage is reduced.

Since the thicknesses of the pixel electrodes 40 and the common electrodes 310 on the protection insulating layer 80 are 1,000 Å or less, and the electrodes are tapered, the alignment layer 90 has a substantially flat surface. Accordingly, the flat surface of the alignment layer 90 allows uniform rubbing, thereby reducing the leakage of light.

Now, a manufacturing method of the panel according to the first embodiment of the present invention will be described. FIGS. 3A–3D are cross-sectional views of the intermediate structures of the panel shown in FIGS. 1 and 2 used to describe the manufacturing steps.

Figure 3A:
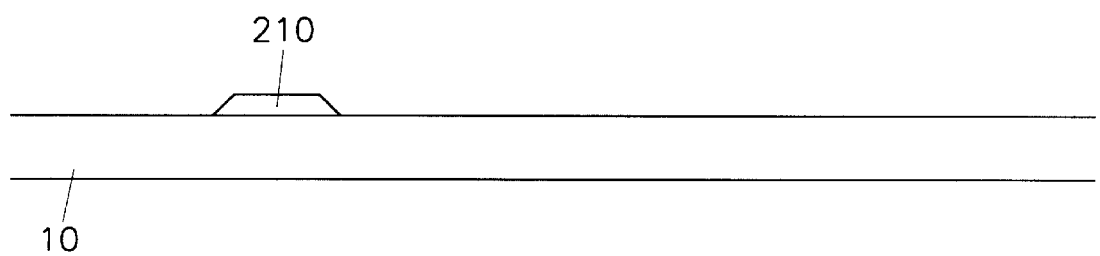
FIGS. 3A–3D are cross-sectional views of the intermediate structures of a thin film transistor substrate shown in FIGS. 1 and 2 used to describe manufacturing steps of the same.

As shown in FIG. 3A, a gate metal is deposited on a substrate 10 and patterned by a photolithography process, and a gate wire including a gate line 20 and a gate electrode 210 and a common signal line 30 are formed using a first mask (see FIG. 1).

Figure 3B:
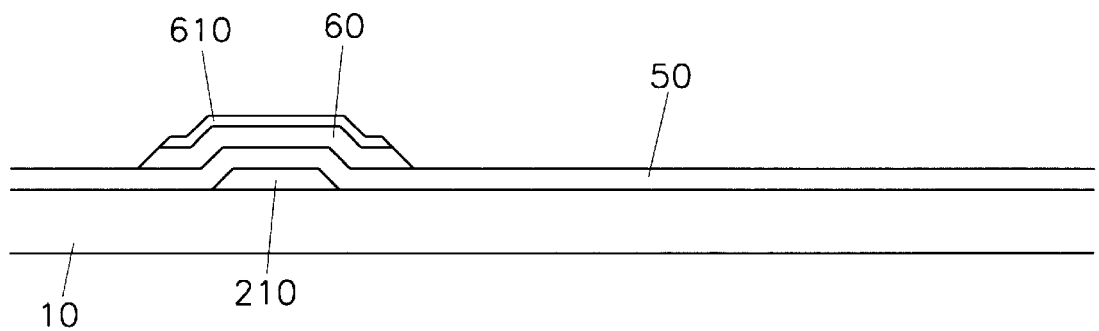

A gate insulating layer 50 made of nitride silicon, an intrinsic amorphous silicon layer and a doped amorphous silicon layer are then deposited in this order. Subsequently, the intrinsic and the doped amorphous silicon layers are patterned together by a photolithography process, using a second mask to form the semiconductor layer 60 of thin film transistor and ohmic contact layer 610, as shown in FIG. 3B.

Figure 3C:
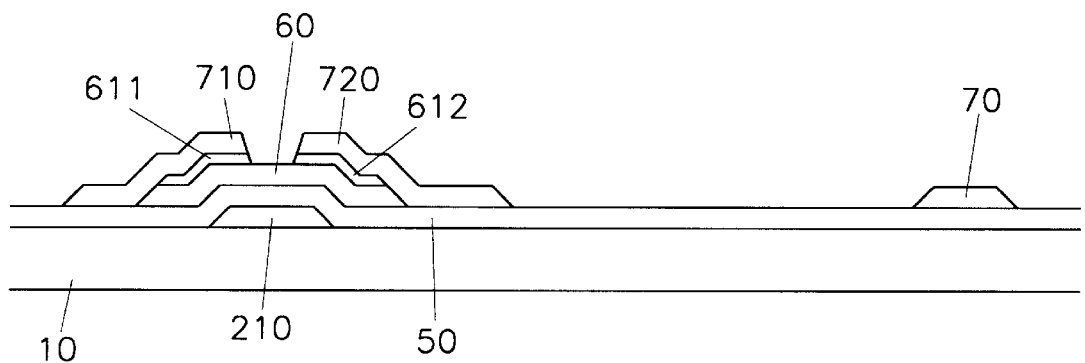

As shown in FIG. 3C, metal is then deposited, and patterned by a photolithography process, using a third mask to form a data line, and source and drain electrodes 710 and 720. The contact layer 610 is etched to form an ohmic contact layer 611 and 612 using the source and the drain electrodes 710 and 720 as a mask.

Figure 3D:
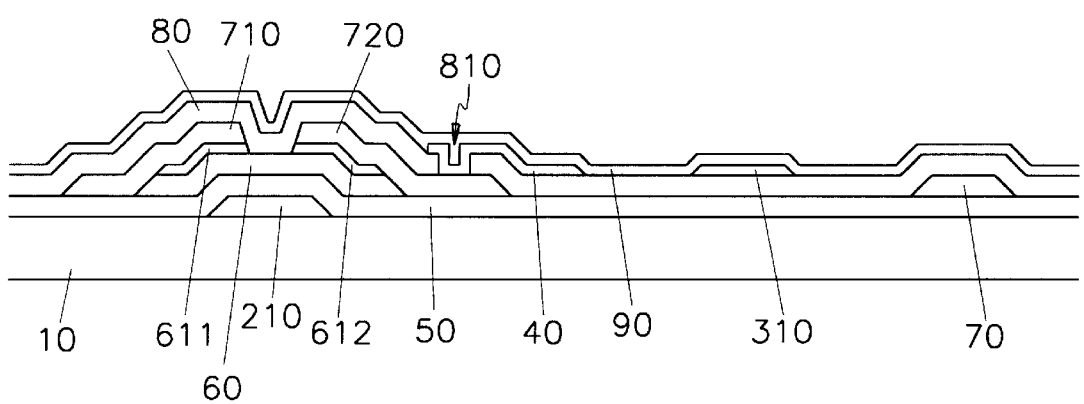

Next, as shown in FIG. 3D, a protection insulating layer 80 such as a silicon nitride layer or a silicon oxide layer, is deposited thereon, and etched along with the gate insulating layer 50 by a photolithography process using a fourth mask to form contact holes 810 (see FIG. 1) on the drain electrode 720 and contact holes 820 (see FIG. 1) on the common signal line 30, and the portion on pad (not shown). Next, a metal layer is deposited and patterned by a photolithography process using a fifth mask to form pixel electrodes 40 and common electrodes 310.

Here, since the pixel electrodes 40 and the common electrodes 310 are made of different layers with the gate line 20 and the common signal line 30, the thicknesses of the electrodes 40 and 310 are minimized, equalling to 1,000 Å or less. It is preferable that the electrodes 40 and 310 are tapered to obtain the alignment layer having a flat surface, and to achieve uniformity in the rubbing step so that the light leakage can be reduced.

Here, the upper portions of the pixel electrodes 40 overlap the common signal line 30 via the gate insulating layer 50 and the protection insulating layer 80, and the lower portion of the pixel electrodes 40 are respectively connected to the drain electrode 720 through the contact holes 810 in the protection insulating layer 80. On the other hand, the upper portions of the common electrodes 310 are respectively connected to the common signal line 30 through the contact holes 820 in the gate insulating layer 50 and the protection insulating layer 80, and the lower portion of the common electrodes 310 overlap the drain electrode 720 via the protection insulating layer 80. Here, storage capacitors are formed under the overlapping portions.

Next, a polyimide layer with a thickness of 700 Å is printed on the substrate 10 and rubbed to form an alignment layer 90. At this time, since the electrodes 40 and 310 are tapered and thin, a flat surface may be obtained for the alignment layer 90, thus realizing uniform rubbing.

In this embodiment, a plurality of the pixel electrodes 40 and common electrodes 310, and the contact holes 810 and 820 corresponding to a plurality of the pixel electrodes 40 and common electrodes 310 are formed. However, a plurality of the pixel and common electrodes 40 and 310 may be formed in a single body by adding a pixel connection portion and a common connection portion, and single contact holes are formed in this case.

The second embodiment of the present invention will be described hereinafter. Here, pixel electrodes and common electrodes are formed on a gate insulating layer, and a protection insulating layer of a pixel region is removed from a thin film transistor substrate.

First, the structure of the panel for a liquid crystal display according to the second embodiment will be described. FIG.

Figure 4:
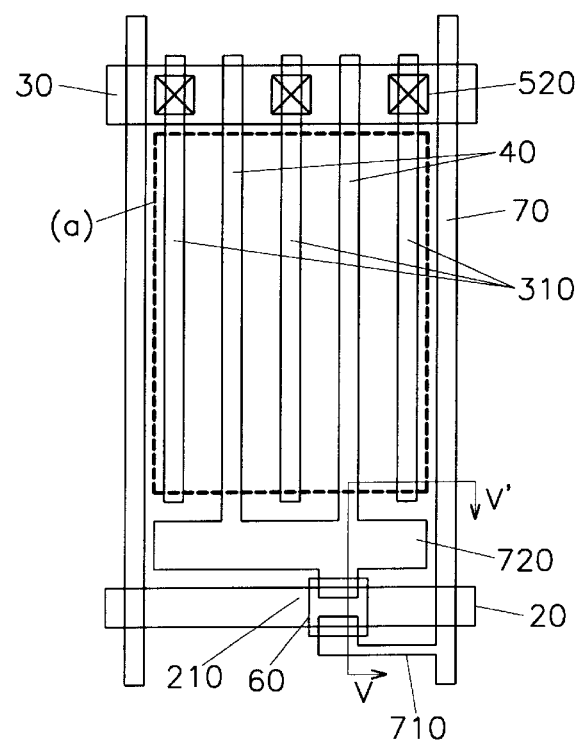
FIG. 4 is a layout view of a panel for a liquid crystal display according to a second embodiment of the present invention.
Figure 5:
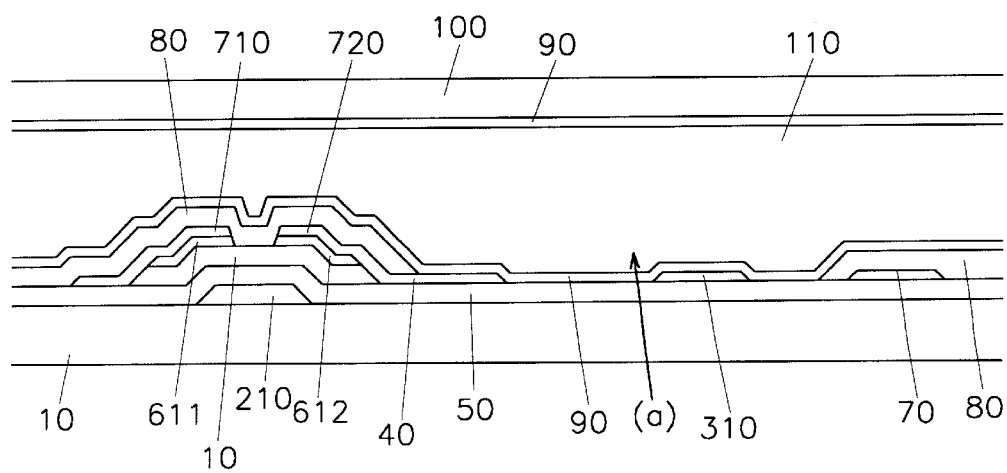
FIG. 5 is a cross-sectional view of the panel shown in FIG. 4 taken along line V—V' of the same drawing.

4 is a layout view of a panel, and FIG. 5 is a cross-sectional view of the panel illustrated in FIG. 4 taken along line V—V' of the same drawing.

As shown in FIGS. 4 and 5, the majority of the structure is similar to the first embodiment. However, common electrodes 310 and pixel electrodes 40, having of 1,000 Å or less are formed on a gate insulating layer 50. Accordingly, the pixel electrodes 40 and the common electrodes 310 are formed on the same layer as the data line 70, and source and drain electrodes 710 and 720. The common electrodes 310 on the gate insulating layer 50 are connected to a common signal line 30 through a contact hole 820 of the gate insulating layer 50, and the pixel electrodes 40 are directly connected to the drain electrode 720. Also, a protection insulating layer 80 is removed from a pixel region where the pixel electrodes 40 and the common electrodes 310 are formed, and a region (a) enclosed by a dotted line is a portion where the protection insulating layer 80 is removed in FIG. 4.

In the second embodiment, since a dielectric material is not present between the electrodes 40 and 310, and an alignment layer 90, the effective voltage applied to the liquid crystal molecules is not decreased, and the occurrence of an afterimage is reduced.

A method of manufacturing a panel for a liquid crystal display according to the second embodiment of the present invention will be now described.

The steps forming a gate line 20, a gate electrode 210 and a common signal line 30, and forming the semiconductor layer 60 of thin film transistor and ohmic contact layer 610 are the same as the steps of the first embodiment.

Next, the portions of a gate insulating layer 50 on the common signal line 30 is etched to form a contact hole 520 (see FIG. 4). Metal is then deposited, and patterned by a photolithography process using a fourth mask to form a data line 70, source and drain electrodes 710 and 720, pixel electrodes 40, and common electrodes 310. The common electrodes 310 contact the common signal line 30 through the contact hole 520 of the gate insulating layer 50. Next, a protection insulating layer 80 is deposited thereon, and etched by a photolithography using a fifth mask to open a portion (a) of a pixel region where the pixel electrodes 40 and the common electrodes 310 are formed.

In the second embodiment, the line resistivity of the data line 70 may be increased due to its thickness of 1,000 Å or less, as the data line 70 are simultaneously formed together with the pixel electrodes 40 and the common electrodes 310. The step forming the multi-layer data line may be necessary to decrease the line resistivity of the data line 70.

The third embodiment of the present invention will be described hereinafter. In the third embodiment, pixel electrodes and common electrodes are formed on a substrate, and a protection insulating layer and a gate insulating layer of a pixel region is removed from a thin film transistor substrate.

Figure 6:
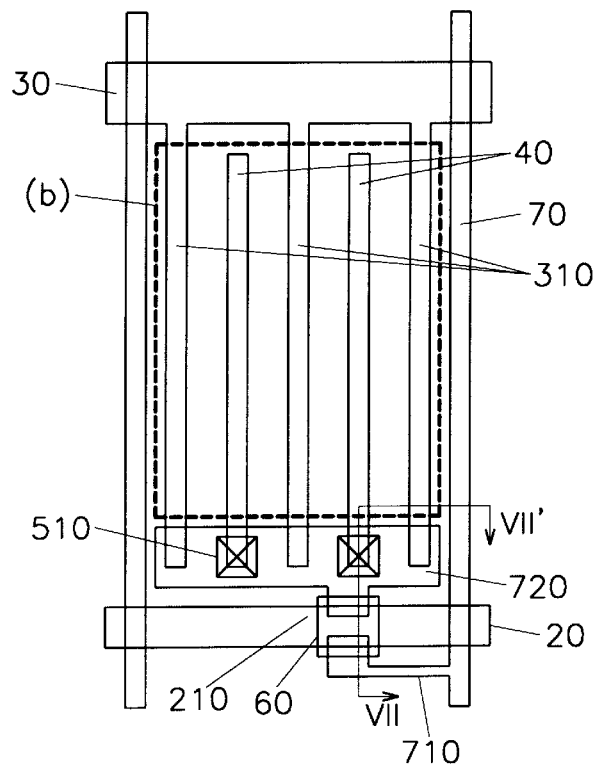
FIG. 6 is a layout view of a panel for a liquid crystal display according to a third embodiment of the present invention.
Figure 7:
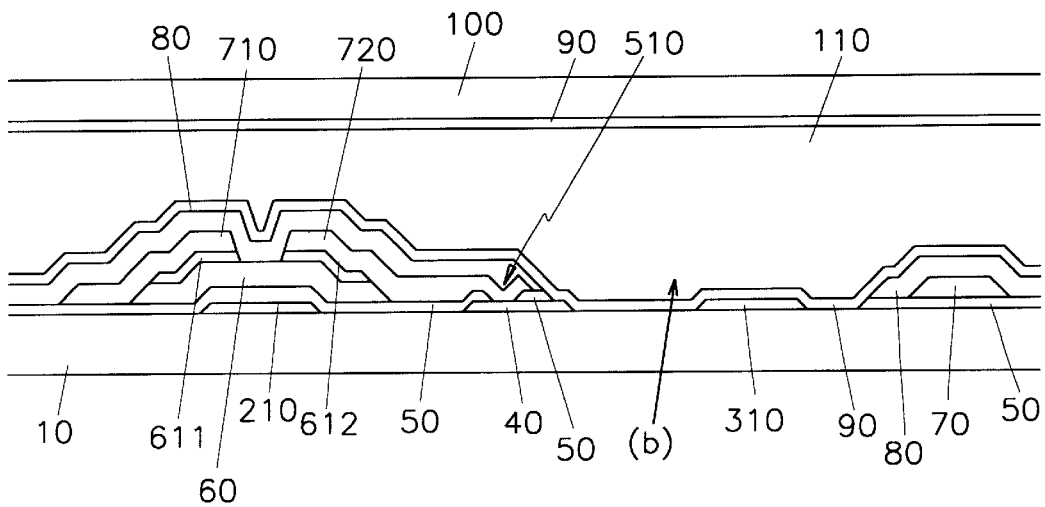
FIG. 7 is a cross-sectional view of the panel shown in FIG. 6 taken along line VII—VII' of the same drawing.

First, the structure of the panel for a liquid crystal display according to the third embodiment will be described. FIG. 6 is a layout view of a panel, and FIG. 7 is a cross-sectional view of the panel illustrated in FIG. 6 taken along line VII—VII' of the same drawing. As shown in FIGS. 6 and 7, the majority of the structure is similar to the first embodiment.

However, common electrodes 310 and pixel electrodes 40, having thicknesses of 1,000 Å or less, are formed on a substrate 10. The pixel electrodes 40 and the common electrodes 310 are formed on the same layer as the gate line 20 and the common signal line 30. The common electrodes 310 are directly connected to a common signal line 30 and the pixel electrodes 40 are connected to the drain electrode 720 through a contact hole 510 of a gate insulating layer 50. Also, the protection insulating layer 80 and the gate insulating layer 50 are removed form a pixel region where the pixel electrodes 40 and the common electrodes 310 are formed, and the region (b) enclosed by a dotted line is a portion where the protection insulating layer 80 and the gate insulating layer 50 are removed in FIG. 6.

In the third embodiment, since a dielectric material is not present between pixel electrodes 40, common electrodes 310, and the alignment layer 90, the effective voltage increases and the afterimage reduces like in the first and second embodiments.

A method of manufacturing a panel for a liquid crystal display according to the third embodiment is similar to the manufacturing method according to the second or third embodiments, shown in FIGS. 6 and 7.

While forming a gate line 20, a gate electrode 210 and a common signal line 30, common electrodes 310 and pixel electrodes 40 are simultaneously formed. Next, the portions of a gate insulating layer 50 on the lower portion of Metal is then deposited and patterned by a photolithography process using a fourth mask and drain electrode 720 connected to the pixel electrodes 40. Next, a protection insulating layer 80 is deposited thereon, and etched along with the gate insulating layer 50 by a photolithography process using a fifth mask to open the portion (b) of pixel region where the pixel electrodes 40 and the common electrodes 310 are formed.

In the third embodiment, the line resistivity of the gate line 20 may be increased due to its thickness of 1,000 Å or less, as the gate line 20 together with the pixel electrodes 40 and the common electrodes 310 are simultaneously formed. The steps forming the multi-layer gate line 20 to decrease the line resistivity of the gate line 20 may be added.

In the above embodiments of the present invention, since the dielectric materials between the common electrodes, the pixel electrodes and the alignment an alignment layer layer are removed, the drive voltage may be reduced and the generation of an afterimage may be prevented. Also, since the common and pixel electrodes have a thickness of 1,000 Å or less and are tapered, the alignment layer may obtain uniform rubbing, and the leakage of light may therefore be prevented.

In the drawings and specification, there have been disclosed preferred embodiments of the invention and, although specific terms are employed, they are used in a generic and descriptive sense only and not for purposes of limitation, the scope of the invention being set forth in the following claims.

What is claimed is:

1. A thin film transistor array panel for a liquid crystal display, comprising:

an insulating substrate;

a gate wire formed on the substrate and including a gate line delivering a scanning signal and a gate electrode connected to the gate line;

a common signal line formed on the substrate and transmitting a common signal;

a gate insulating layer formed over the gate wire and the common signal line;

a semiconductor layer formed on a portion of the gate insulating layer over the gate electrode;

a data line formed on the gate insulating layer and transmitting an image signal;

source electrode formed on the semiconductor layer and connected to the data line;

a drain electrode formed on the semiconductor layer and separated from the source electrode;

common electrodes connected to the common signal line;

pixel electrodes formed respectively between the common electrodes and connected to the drain electrode;

a protection insulating layer covering the source and the drain electrodes and the data line; and an alignment layer formed on the common electrodes and the pixel electrodes and aligning liquid crystal material, wherein the common electrodes overlap the drain electrode via the protection insulating layer.

2. The thin film transistor array panel of claim 1, wherein the pixel electrodes overlap the common signal line via the protection insulating layer and the gate insulating layer.

3. The thin film transistor array panel of claim 2, wherein the thickness of the common electrodes and the pixel electrodes is 1,000 Å or less.

4. The thin film transistor array panel of claim 3, wherein the pixel electrodes and the common electrodes are tapered.

5. The thin film transistor array panel of claim 4, wherein the common electrodes and the pixel electrodes are formed on the gate insulating layer, the common electrodes are connected to the common signal line through contact holes formed in the gate insulating layer, and the protection insulating layer exposes the pixel electrodes and the common electrodes.

6. The thin film transistor array panel of claim 5, wherein the pixel electrodes overlap the common signal line via the gate insulating layer.

7. The thin film transistor array panel of claim 1, wherein the common electrodes and the pixel electrodes are formed on the substrate, the pixel electrodes are connected to the drain electrode through contact holes formed in the gate insulating layer, and the protection insulating layer and the gate insulating layer expose the pixel electrodes and the common electrodes.

8. The thin film transistor array panel of claim 7, wherein the common electrodes overlap the drain electrode via the gate insulating layer.

9. A method of manufacturing a liquid crystal display, comprising the steps of:

forming a gate line, a gate electrode connected to the gate line, and a common signal line on an insulating substrate;

forming a gate insulating layer;

forming a semiconductor layer on the gate insulating layer of the gate electrode;

forming a data line, a source electrode, a drain electrode, common electrodes and pixel electrodes;

depositing a protection insulating layer;

exposing the common electrodes and the pixel electrodes by patterning the protection insulating layer; and coating an alignment layer.

10. The method of claim 9, wherein the thickness of the common electrodes and the pixel electrodes is 1,000 Å or less.

11. The method of claim 10, wherein the edges of the common electrodes and the pixel electrodes are tapered.

12. A method of manufacturing a liquid crystal display, comprising the steps of:

forming a gate line, a gate electrode connected to the gate line, a common signal line, and common electrodes and pixel electrodes on an insulating substrate;

forming a gate insulating layer;

forming a semiconductor layer on the gate insulating layer of the gate electrode;

forming a data line, a source electrode connected to the data line and a drain electrode;

depositing a protection insulating layer;

exposing the common electrodes and the pixel electrodes by patterning the protection insulating layer and the gate insulating layer; and coating an alignment layer.

13. The method of claim 12, wherein the thickness of the common electrodes and the pixel electrodes is 1,000 Å or less.

14. The method of claim 13, wherein the edges of the common electrodes and the pixel electrodes are tapered.

\* \* \* \* \*